Sept. 17, 1929.　　　C. L. FLAVIN　　　1,728,727
EYEGLASS CONSTRUCTION
Filed April 19, 1924
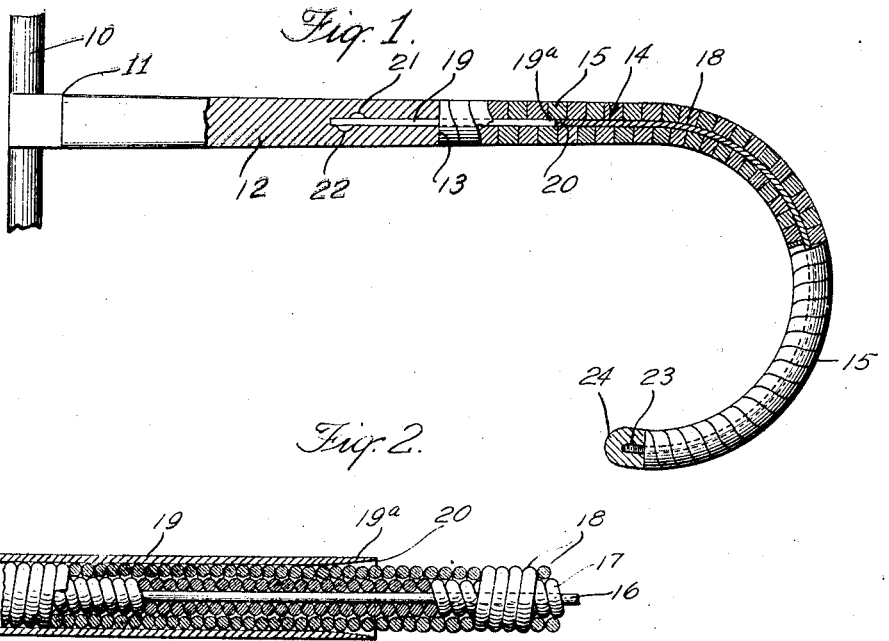
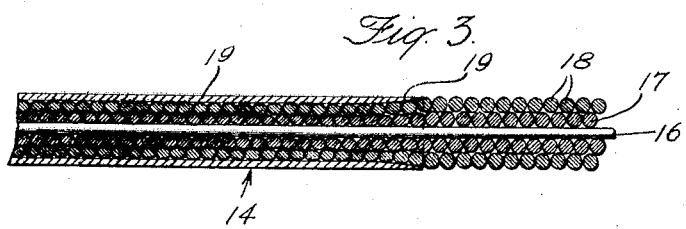
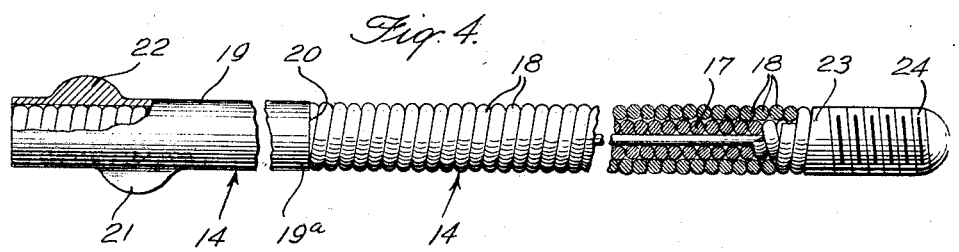
INVENTOR
Charles L. Flavin
BY
Robert L. Blair
ATTORNEY Patented Sept. 17, 1929

1,728,727

UNITED STATES PATENT OFFICE

CHARLES L. FLAVIN, OF ATTLEBORO, MASSACHUSETTS, ASSIGNOR TO BAY STATE OPTICAL COMPANY, OF ATTLEBORO, MASSACHUSETTS, A CORPORATION OF MAINE

EYEGLASS CONSTRUCTION

Application filed April 19, 1924. Serial No. 707,586.

This invention relates to eyeglass construction and more particularly to the construction of eyeglass temple bars.

One of the objects of the invention is to provide a construction of the above nature capable of affording the wearer thereof a high degree of comfort and convenience. Another object is to provide such a construction, strong and durable, capable of rigorous and long continued service without breakage. Another object is to provide such a construction in which the parts thereof are conveniently assembled and securely and dependably held in assembled relation. Another object is to provide a practical and effective art of making eyeglass temple bars which may conveniently be carried on at low cost and with simple apparatus. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawing in which are shown various possible embodiments of the several mechanical features of this invention, Figure 1 is a side elevation of a temple bar partly in section to better disclose the structure.

Figure 2 is a fragmentary view in greatly enlarged detail showing parts of the temple bar in the process of manufacture.

Figure 3 is a view similar to Figure 2 showing the parts at a later stage, and

Figure 4 shows partly cut away the parts completed and in readiness for assembly.

Similar reference characters refer to similar parts throughout the several views of the drawing.

Referring now to the drawing in detail, there is shown in Figure 1 an eyeglass temple bar joined at its forward end to a rim or other suitable lens mounting 10 preferably by means of a hinged connection indicated at 11. The forward portion of this temple bar preferably comprises a substantially solid main body portion 12 extending rearwardly from the connection 11 and terminating, for example, at 13. This main body portion 12 is preferably of celluloid, it being understood that the term "celluloid" as employed herein is to be interpreted in a broad sense to comprehend various non-metallic materials of a nature similar to that of celluloid and adapted to form eyeglass frames and associated parts.

The rear portion of the temple bar extending rearwardly from the body portion 12, is flexible, being adapted to yieldingly engage the parts of the head to hold the eyeglasses in position, and the rear end is shaped to any desired curvature to engage the ear or side of the head, being illustratively shown in the drawing as of a hooked shape adapted to hook over the ear of the wearer. This rear flexible portion comprises an inner metallic core member indicated generally at 14 and a flexible covering of celluloid thereabout. The celluloid covering preferably takes the form of a spirally wound strip 15 of any desired cross-section, its cross-section in the drawing being shown as substantially rectangular. The forward end of the metallic core 14 is secured to the main body portion 12, preferably by being embedded therein, as will more fully be described hereinafter.

Considering now more particularly the construction of this metallic core 14, in Figure 2, there is shown in enlarged detail a portion of this core at an early stage in the process of manufacture of the temple bar. About an inner wire member or core 16 is wound a wire member 17 preferably in spiral fashion, as shown, and tightly coiled about the member 16. Thereupon a second wire member 18 is coiled exterior of the winding 17 and preferably coiled in a spiral wound in a direction opposite to that of the winding 17. There are thus provided about the wire member 16 two spiral wire windings tightly coiled thereabout, one above the other, and wound in opposite directions.

Over a portion of this double winding, and exterior of the coil 18, is now placed a sleeve or tube 19 of metal. This sleeve 19 is of such diameter as to readily slide into position, its outside diameter being thus greater than the outside diameter of the outer winding 18. By any desired means, such as a suitable reducing machine, the sleeve 19 is now reduced in diameter, the walls thereof being forced or compressed inwardly, it being understood that by the term "inwardly" is meant in a direction toward the longitudinal axis of the tube and of the windings 17 and 18. This reduction in diameter of the sleeve 19 compresses the coils of the windings 17 and 18 within the sleeve forcing them inwardly and resulting in a flattening and compressing thereof, as shown in Figure 3. The compressing of the sleeve 19 and the coil therein is preferably carried to such an extent that the resulting outside diameter of the sleeve is substantially that of the normal outside diameter of the outer winding 18, so that the combined parts 16, 17, 18 and 19 form a member which is substantially uniform in diameter throughout its length.

The member formed by the wire 16 and the wire coils 17 and 18 thereabout is flexible, being highly springy and resilient, capable of being bent and twisted without danger of breakage. The portion thereof reinforced by and having its coils held in compressed relation by the sleeve 19, is also flexible, but not to as great a degree, being stiffened by the compression and reinforcement. As shown in Figures 2 and 3, the walls of the end portion of the sleeve 19 are preferably weakened by being made thinner, as shown at 19ᵃ. This is preferably brought about by tapering the inner wall of the sleeve at this point to give the mouth of the sleeve a substantially bell shape. The reinforcement at this portion 19ᵃ, is therefore not as great as at the other portions of the sleeve, nor are the coils beneath this portion 19ᵃ compressed to as great an extent as those beneath the remaining portions of the sleeve, as is brought out in Figure 3. The change in flexibility, therefore, from the reinforced portion of the coils to the non-reinforced portions thereof, is not abrupt, but rather there is brought about a gradual change from minimum flexibility to maximum flexibility. This is of distinct advantage in preventing breakage at the end of the sleeve 19 as the core member is repeatedly flexed.

The portion of this flexible core, formed as above described, which is reinforced by the sleeve 19, comprises the forward portion of the core 14 as assembled in the eyeglass temple bar, and is of a predetermined length. By reference to Figure 1, this portion of the core reinforced by the sleeve 19, is seen to be embedded in the rear portion of the celluloid member 12 and of such length as to extend rearwardly therefrom to a point 20, for example. The core 14 rearwardly of the point 20 comprises the highly flexible portion formed by the non-reinforced coils 17 and 18 about the wire core 16. The entire core 14, having thus been formed, and of the required length, there are preferably struck up from the surface of the sleeve 19, adjacent its forward end, as shown in Figure 4, a pair of lugs 21 and 22. These lugs, when embedded in the non-metallic member 12 provide a secure anchorage for the core 14 therein and prevent turning of the core in its anchorage. At the extreme rear end of the core 14, the coils 17 and 18 are preferably soldered as indicated at 23, in Figure 4, and this soldered portion is threaded.

The completed metallic core member 14 is now secured to the celluloid member 12, as shown in Figure 1. This may be done by first forming an axial recess in the rear end of the celluloid member 12, thereupon softening the celluloid and forcing the forward end of the core 14 thereinto. The celluloid may then be firmly pressed inwardly about the portion of the core therein and a secure connection aided by the lugs 21 and 22 is had. The celluloid strip 15 is thereupon wound about the core 14, its forward end being secured at 13 to the rear end of the member 12 by cementing or other suitable treatment. Upon the rear threaded end 23 of the core 14 is threaded a rounded celluloid cap 24 and the rear end of the winding 15 is secured to this cap by cementing or other suitable treatment. The spiral celluloid winding 15, it will be seen, forms a covering which completely encases the core 14, and one which is readily flexed with the flexible core. The rear portion of the temple bar is thereupon, with suitable treatment, shaped to the curved contour which it is desired that the completed temple bar have.

There is thus provided a temple bar which has an outer all-celluloid appearance. The forward portion thereof is substantially rigid while the rear portion thereof is highly flexible and resilient, adapted to yieldingly and comfortably engage the head or ear to hold the eyeglasses in place. The forward portion of the core 14 rearwardly of the main body member 12, being reinforced and stiffened, as above described, the change from substantial rigidity to high resilience and flexibility is not sudden, but gradual, so that when the temple bar is flexed the tendency to yield primarily at the junction of the flexible portion with the main body portion 12, is avoided. The core 14 being reinforced, as has been described, provides in effect for a gradual increase of flexibility rearwardly from the substantially rigid member 12. Furthermore, this metallic core 14 is free from points of weakness which would be susceptible to coming apart or breaking.

From the above it will be seen that there are herein provided a temple bar construction and art of making the same which embody the features of this invention and attain many advantages of great practical importance.

As many possible embodiments may be made of the mechanical features of the above invention and as the art herein described might be varied in various parts all without departing from the scope of the invention, it is to be understood that all matter herein set forth or shown in the accompanying drawings is to be interpreted as illustrative and not in a limiting sense.

I claim as my invention:

1. The herein described art of making eyeglass temple bars which consists in winding a metal wire member into a flexible spirally coiled temple bar member, forming a metal sleeve member having longitudinally continuous walls of lesser length than said coil and having an inner diameter substantially equal to the outer diameter of said coiled temple bar member, thinning the walls of said sleeve member at one end thereof, placing said sleeve member about a portion of said coiled temple bar member and contracting said sleeve about said portion.

2. The herein described art of making eyeglass temple bars which consists in coiling a metal wire member into a spiral coil, winding a second spiral coil of wire exterior of and about said first coil to form with said first coil a flexible temple bar member, and applying a continuous metal covering exterior of and about a portion of the length of said second coil to render said portion of said temple bar member less flexible than the remaining portion thereof.

3. The herein described art of making eyeglass temple bars which consists in spirally coiling a metal wire member, spirally coiling a second wire member exterior of and about said first coil, placing a metal stiffening sleeve exterior of said second coil but only throughout a portion of the length of said coils to stiffen said portion and to leave the remaining portion flexible, and compressing said sleeve and said coils therein to reduce the diameter thereof to one substantially commensurate with the diameter of the remaining portion of the length of said coils.

4. The herein described art of making eyeglass temple bars which consists in spirally winding a plurality of superposed layers of metal wire about a wire core member to form a flexible temple bar member, and tightly fitting about and exterior of said layers throughout a portion only of their length, a metal sleeve member to render said portion of said temple bar member less flexible than the remainder thereof.

5. The herein described art of making eyeglass temple bars which consists in winding a metal wire member in a spiral about a wire core member to form a flexible temple bar member, placing about the exterior of said flexible temple bar member throughout a portion of the length thereof a stiffening metal sleeve, and compressing said coils within said sleeve by contracting said sleeve to an outer diameter substantially equal to the normal outer diameter of said coil, to render said portion of said temple bar member less flexible than the remainder thereof.

6. The herein described art of making eyeglass temple bars, which consists in spirally coiling a metal wire member about a core member, applying metallic reenforcing means about the exterior of an end portion of said coil to stiffen said portion, inserting a part of said reenforced end portion in the rear end of a celluloid temple bar member, and placing a flexible celluloid covering about the projecting part of said reenforced portion and about the remainder of said coiled wire member.

7. The herein described art of making eyeglass temple bars, which consists in spirally coiling a metal wire member, applying a reenforcing sleeve about the exterior of an end portion of said coil to stiffen the same, shaping the opposite end portion of said coil to a curved contour, placing a substantially solid celluloid covering about a part of said stiffened portion, and placing a coiled celluloid covering in strip form about the remainder of said stiffened portion and about the unstiffened portion of said coil.

8. The herein described art of making eyeglass temple bars, which consists in spirally coiling a metal wire member, placing a metal sleeve over an end portion of said coil, forcing said sleeve inwardly to compress the portion of said coil therein and to stiffen the same, shaping the unstiffened portion of said coil to a curved contour, placing a substantially solid celluloid covering about a part of said stiffened portion, and placing a coiled celluloid covering in strip form about the remainder of said stiffened portion and about said unstiffened portion.

9. In eyeglass construction, a temple bar having a relatively rigid portion and a relatively flexible portion extending rearwardly therefrom, including, in combination, a spirally coiled wire member extending forwardly from the rear end of said temple bar, and a metal sleeve about said coiled member extending throughout a substantial length of the forward portion thereof and stiffening said portion, said sleeve having an outer diameter substantially equal to the diameter of the portion of said coil rearwardly thereof and holding the coils therebeneath in compressed relation.

10. In eyeglass construction, a temple bar having a relatively rigid portion and a relatively flexible portion extending rearwardly therefrom, including, in combination, a spirally coiled metal wire member extending forwardly from the rear end of said temple bar, the coils thereof throughout a substantial length of a forward portion thereof being stiffened by being compressed inwardly, said compression decreasing gradually in magnitude adjacent the rear end of said compressed portion, and means about said compressed coils holding them in said compressed relation.

11. In eyeglass construction, a temple bar having a relatively rigid portion and a relatively flexible portion extending rearwardly therefrom, including, in combination, a member extending forwardly from the rear end of the temple bar comprising a plurality of superposed spiral coils of metal wire wound about a core, and a metal sleeve extending about a substantial length of the forward portion of said member and stiffening said portion.

12. In construction for eyeglass temple bars, in combination, a main body portion of celluloid joined at its forward end to a lens mounting, and a metallic extension extending rearwardly from said main body portion and comprising a spirally coiled wire member having its forward portion stiffened by a reinforcing metal sleeve thereabout, said sleeve being contracted about said forward portion and having an outer diameter substantially that of the remaining portion of said coiled wire member.

13. In eyeglass construction, a temple bar comprising, in combination, a forward relatively rigid main body portion of celluloid, a coiled celluloid portion extending rearwardly from the rear end of said main body portion, a metal tube having continuous walls within said coiled celluloid portion extending through a portion only thereof adjacent the rear end of said main body portion, and a coiled metal wire member entering said tube and extending rearwardly thereof through said coiled celluloid portion.

14. In eyeglass construction, a temple bar comprising, in combination, a forward relatively rigid main body portion of celluloid, a coiled celluloid portion extending rearwardly from the rear end of said main body portion, a metal tube having continuous walls within said coiled celluloid portion extending through a portion only thereof adjacent the rear end of said main body portion, a coiled metal wire member entering said tube and extending rearwardly thereof through said coiled celluloid portion, and a wire core within said coiled wire member.

15. In eyeglass construction, a temple bar comprising, in combination, a forward relatively rigid main body portion of celluloid, a coiled celluloid portion extending rearwardly from the rear end of said main body portion, a flexible metallic member within said coiled celluloid portion extending substantially throughout the entire length thereof and entering the rear end of said main body portion, and a metal tube having continuous walls positioned about said flexible metal member within a part of said coiled celluloid portion immediately adjacent to the rear end of said main body portion.

16. In eyeglass construction, a temple bar comprising, in combination, a forward relatively rigid main body portion of celluloid, a coiled celluloid portion extending rearwardly from the rear end of said main body portion, a flexible metallic member within said coiled celluloid portion extending substantially throughout the entire length thereof and entering the rear end of said main body portion, and a metal tube having continuous walls positioned about said flexible metal member within a part of said coiled celluloid portion immediately adjacent to the rear end of said main body portion, said metal tube extending also into the rear end of said main body portion.

17. In eyeglass construction, a temple bar comprising, in combination, a forward relatively rigid main body portion of celluloid, a coiled celluloid portion extending rearwardly from the rear end of said main body portion, a flexible metallic member within said coiled celluloid portion extending substantially throughout the entire length thereof and entering the rear end of said main body portion, and a metal tube having continuous walls positioned about said flexible metal member within a part of said coiled celluloid portion immediately adjacent to the rear end of said main body portion, said metal tube extending also into the rear end of said main body portion and having in its surface projections interlocking with the celluloid thereof.

18. In eyeglass construction, a temple bar comprising, in combination, a forward relatively rigid main body portion of celluloid, a coiled celluloid portion extending rearwardly from the rear end of said main body portion, said flexible metallic member comprising an inner wire core member and coiled wire thereabout, and a metal stiffening tube having continuous walls positioned within said coiled celluloid portion at the part thereof immediately adjacent the rear end of said main body portion, said metal tube being positioned between the outer surface of said coiled wire and the inner surface of said coiled celluloid portion and being fitted tightly about the metal coils therebeneath.

19. In eyeglass construction, a temple bar comprising, in combination, a relatively rigid forward portion and a relatively flexible rear portion, said rear portion including a coiled metal wire member joined at its forward end to said relatively rigid forward portion, and a stiffening metal sleeve having continuous walls positioned about a forward portion of said coiled member and extending along the same rearwardly of the rearmost point of connection between said relatively rigid forward portion and said coiled member.

20. In eyeglass construction, a temple bar comprising, in combination, a relatively rigid forward portion and a relatively flexible rear portion, said rear portion including a coiled metal wire member joined at its forward end to said relatively rigid forward portion, a stiffening metal sleeve having longitudinally continuous walls positioned about a forward portion of said coiled member and extending along the same rearwardly of the rearmost point of connection between said relatively rigid forward portion and said coiled member, and a flexible covering of celluloid joined at its forward end to said relatively rigid forward portion and extending about said sleeve and said coiled wire member.

In testimony whereof, I have signed my name to this specification this eleventh day of April, 1924.

CHARLES L. FLAVIN.